United States Patent
Güntherberg et al.

(10) Patent No.: US 6,566,436 B1
(45) Date of Patent: May 20, 2003

(54) MOLDED FORMS FOR USE IN GARDENING AND ANIMAL HUSBANDRY

(75) Inventors: Norbert Güntherberg, Speyer (DE); Heiner Görrissen, Ludwigshafen (DE); Graham Edmund Mc Kee, Neustadt (DE); Norbert Niessner, Friedelsheim (DE); Martin Weber, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/806,863

(22) PCT Filed: Oct. 6, 1999

(86) PCT No.: PCT/EP99/07491

§ 371 (c)(1),
(2), (4) Date: Apr. 5, 2001

(87) PCT Pub. No.: WO00/20510

PCT Pub. Date: Apr. 13, 2000

(30) Foreign Application Priority Data

Oct. 7, 1998 (DE) .......................................... 198 46 244

(51) Int. Cl.[7] .................................................. C08L 5/00
(52) U.S. Cl. .......................... 524/504; 525/67; 525/71; 525/84; 525/86; 119/416; 119/516
(58) Field of Search ............................ 524/504; 525/67, 525/71, 84, 86; 119/516, 416

(56) References Cited

FOREIGN PATENT DOCUMENTS

| DE | 4234 296 | | 4/1994 |
|---|---|---|---|
| DE | 196 30 061 | | 1/1998 |
| DE | 196 30 062 | | 1/1998 |
| WO | WO 9804622 | * | 2/1998 |
| WO | WO 9804629 | * | 2/1998 |

* cited by examiner

Primary Examiner—David W. Wu
Assistant Examiner—William Cheung
(74) Attorney, Agent, or Firm—Keil & Weinkauf

(57) ABSTRACT

The use of a thermoplastic molding composition which is not ABS, comprising, based on the total of the amounts of components A, B, C, and, where appropriate, D, this total being 100% by weight, a: as component A, from 1 to 48% by weight of at least one particulate emulsion polymer which has one or more phases and has a glass transition temperature below 0° C. in at least one phase, and has a median particle size from 50 to 1000 nm, b: as component B, from 1 to 48% by weight of at least one amorphous or semicrystalline polymer, c: as component C, from 51 to 90% by weight of polycarbonates, and d: as component D, from 0 to 47% by weight of conventional addictives and/or fibrous or particulate fillers, or a mixture of these, for producing moldings, or corresponding semifinished products, for the garden sector or animal-keeping sector.

4 Claims, No Drawings

MOLDED FORMS FOR USE IN GARDENING AND ANIMAL HUSBANDRY

The invention relates to moldings for the garden sector or animal-keeping sector. In particular, it relates to moldings of this type which have high stability, good chemicals resistance, and good yellowing resistance, together with high dimensional stability. Materials used hitherto have a large number of disadvantages. Wood has insufficient weathering resistance and is susceptible to mold and rot, and to damage due to biting by small animals or to consumption by insects. High maintenance costs are unavoidable.

Sheet steel has a high density and is therefore heavy. It is susceptible to corrosion and difficult to work with ABS (acrylonitrile-butadiene-styrene) polymers do not always have adequate scratch resistance, and they embrittle rapidly in outdoor applications as a result of post crosslinking of the butadiene double bonds. This is associated with impairment of mechanical properties, in particular of toughness. The moldings exhibit discoloration and bleaching Swelling performance with respect to alcohols and to cleaning compositions is inadequate, and discoloration occurs in contact with gasoline.

ASA (acrylonitrile-styrene-acrylate) molding compositions exhibit good stress cracking performance, but their scratch resistance, color depth and toughness/stiffness ratio are not adequate for every application, and the preparation of a blend via addition of small amounts of polycarbonate does not give any adequate improvement.

It is an object of the present invention, therefore, to provide moldings for the garden sector or animal-keeping sector which are stable and chemicals-resistant, and which do not yellow, for use in producing filters, pumps, or motors. The housings or protective coverings should also be scratch-resistant and have good dimensional stability. Their UV resistance and heat-aging resistance should be high, so that their surface gloss is also retained. Other requirements are good recyclability and good flame retardancy, and also good dimensional stability under thermal stress during production and use.

We have found that this object is achieved by the use of a thermoplastic molding composition which is not ABS and which comprises, based on the total of the amounts of components A, B, C, and, where appropriate, D, this total being 100% by weight,

- a: as component A, from 1 to 48% by weight of at least one particulate emulsion polymer which has one or more phases and has a glass transition temperature below 0C in at least one phase, and has a median particle size from 50 to 1000 nm,
- b: as component B, from 1 to 48% by weight of at least one amorphous or semicrystalline polymer,
- c: as component C, from 51 to 98% by weight of polycarbonates, and
- d: as component D, from 0 to 47% by weight of conventional additives and/or fibrous or particulate fillers, or a mixture of these, for producing moldings and semi-finished products for the garden sector or animal-keeping sector.

Glass transition temperatures given for phases are based on a polymer whose makeup corresponds to that of the phase in question.

The moldings described for the garden sector or animal-keeping sector are scratch-resistant, stable, and chemicals-resistant. They also have very good yellowing resistance and depth of color.

The components of the thermoplastic molding compositions used according to the invention to produce the moldings of the invention for the garden sector or animal-keeping sector are known per se. Examples of descriptions of molding compositions and components which can be used according to the invention are found in DE-A-12 60 135, DE-C-19 11 882, DE-A-28 26 925, DE-A-31 49 358, DE-A-32 27 555 and DE-A-40 11 162.

In one embodiment, the molding compositions which are not ABS and which are used according to the invention for producing the moldings of the invention for the garden sector or animal-keeping sector comprise the components listed below and as defined hereinafter: A, B, C, and, where appropriate, D. Based on the total of the amounts of components A, B, C, and, where appropriate, D, this total being 100% by weight, they comprise

- a: as component A, from 1 to 48% by weight, preferably from 3 to 35% by weight, in particular from: 5 to 30% by weight, of a particulate emulsion polymer which has a glass transition temperature below 0° C., and has a median particle size from 50 to 1000 nm, preferably from 5 to 800 nm,
- b: as component B, from 1 to 48% by weight, preferably from 5 to 40% by weight, in particular from 5 to 35% by weight, of at least one amorphous or semicrystalline polymer,
- c: as component C, from 51 to 98% by weight, preferably from 55 to 90% by weight, in particular from 60 to 85% by weight, of polycarbonates, and
- d: as component D, from 0 to 47% by weight, preferably from 0 to 37% by weight, in particular from 0 to 30% by weight, of additives or a mixture of these.

The invention is described in more detail below.

The molding compositions used for producing the moldings of the invention for the garden sector or animal-keeping sector are first described, together with the components of which they are composed.

Component A

Component A is at least one particulate emulsion polymer which has one or more phases and has a glass transition temperature below 0° C. in at least one phase, and has a median particle size of from 50 to 1000 nm.

Component A is preferably a polymer having more than one phase and made from

- a1: from 1 to 99% by weight, preferably from 15 to 80% by weight, in particular from 40 to 65% by weight, of a particulate first phase A1 with a glass transition temperature below 0° C.,
- a2: from 1 to 99% by weight, preferably from 20 to 85% by weight, in particular from 35 to 60% by weight, of a second phase A2 made from the following monomers, based on A2,
  - a21: as component A21, from 40 to 100% by weight, preferably from 65 to 85% by weight, of units of a vinylaromatic monomer, preferably of styrene, of a substituted styrene, or of a (meth)acrylic ester or a mixture of these, in particular of styrene and/or of α-methylstyrene, and
  - a22: as component A22, from 0 to 60% by weight, preferably from 15 to 35% by weight, of units of an ethylenically unsaturated monomer, preferably of acrylonitrile or of methacrylonitrile, in particular of acrylonitrile, and
- a3: as component A3, from 0 to 50% by weight of a third is phase with a glass transition temperature above 0° C., where the total amount of components A1, A2, and A3 is 100% by weight.

The phases here may be bonded to one another by graft copolymerization. For example, the first phase A1 here may form the graft base and the second phase A2 may form a graft. A number of phases may be provided, giving a graft copolymer with a graft base and a number of grafts. The graft does not necessarily need to be in the form of a shell around the graft core. A variety of geometries is possible: for example, the second phase A2 may cover a part of the first phase A1, or interpenetrating networks may form, etc. It is particularly preferable for the first phase A1 to have a glass transition temperature below $-102^{0}$ C., in particular below $-15°$ C. The third phase preferably has a glass transition temperature above 60° C. The amount present of this third phase may be from 1 to 50% by weight, in particular from 5 to 40% by weight, for example, based on component A.

In the text below, "first phase" means the same as "graft base", and correspondingly "second phase" means the same as "craft"

The third phase may preferably have been built up from more than 50% by weight of styrene, in particular from more than 80% by weight of styrene, based on the total value for the monomers of the third phase.

In one embodiment of the invention, component A1 is composed of the following monomers a11: as component A11, from 80 to 99.99% by weight, preferably from 95 to 99.9% by weight, of a $C_1$–$C_6$-alkyl acrylate, preferably n-butyl acrylate and/or ethylhexyl acrylate, a12: as component A12, from 0.01 to 20% by weight, preferably from 0.1 to 5.0% by weight, of at least one polyfunctional crosslinking monomer.

In one embodiment of the invention, the median particle size of component A is from 50 to 1000 nm, preferably from 50 to 800 nm.

In another embodiment of the invention, based on the total weight of component A, the particle size distribution of component A is bimodal, from 1 to 99% by weight, preferably from 20 to 95% by weight, in particular from 45 to 90% by weight, having a median particle size of from 50 to 200 nm, and from 1 to 99% by weight, preferably from 5 to 80% by weight, in particular from 10 to 55% by weight, having a median particle size of from 200 to 1000 nm.

The median particle size and particle size distribution given are the sizes determined from the cumulative weight distribution. The median particle sizes according to the invention are in all cases the ponderal median particle size. The determination of these was based on the method of W. Scholtan and H. Lange, Kolloid-Z. und Z.-Polymere 250 (1972), pages 782–796, using an analytical ultra-centrifuge. The ultracentrifuge measurement gives the cumulative weight distribution of the particle diameter of a specimen. From this it is possible to deduce what percentage by weight of the particles have a diameter identical to or smaller than a particular size. The median particle diameter, which is also termed the $d_{50}$ of the cumulative weight distribution, is defined here as the particle diameter at which 50% by weight of the particles have a diameter smaller than that corresponding to the $d_{50}$. Equally, 50% by weight of the particles then have a larger diameter than the $d_{50}$. To describe the breadth of the. particle size distribution of the rubber particles, $d_{50}$ and $d_{90}$ values given by the cumulative weight distribution are utilized alongside the $d_{50}$ value (median particle diameter) The $d_{10}$ and $d_{90}$ of the cumulative weight distribution are defined similarly to the $d_{50}$ with the difference that they are based on, respectively, 10 and 90% by weight of the particles. The quotient $$d_{90}-d_{10}/d_{50}=Q$$

is a measure of the breadth of the particle size distribution.

The glass transition temperature of the emulsion polymer A, and also of the other components used according to the invention, is determined using DSC (differential scanning calorimetry) in accordance with ASTM 3418 (midpoint temperature).

The rubbers which can be used as emulsion polymer A are the usual relevant rubbers such as, in one embodiment of the invention, epichlorohydrin rubbers, ethylene-vinyl acetate rubbers, polyethylene chlorosulfone rubbers, silicone rubbers, polyether rubbers, hydrogenated diene rubbers, polyalkenamer rubbers, acrylate rubbers, ethylene-propylene rubbers, ethylene-propylene-diene rubbers, butyl rubbers and fluorine rubbers. Preference is given to acrylate rubber, ethylene-propylene (EP) rubber and ethylene-propylene-diene (EPDM) rubber, in particular acrylate rubber.

Pure butadiene rubbers, as used in ABS, may not be used as the sole component A. The molding compositions are preferably free from butadiene rubbers.

In one embodiment, the fraction of the fundamental diene building block in the emulsion polymer A is held so low that very few unreacted double bonds remain in the polymer. In one embodiment there are no fundamental diene building blocks in the emulsion polymer A.

The acrylate rubbers are preferably alkyl acrylate rubbers made from one or more $C_1$–$C_8$-alkyl acrylates, preferably $C_4$–$C_8$-alkyl acrylates, where use is preferably made at least to some extent of butyl, hexyl, octyl or 2-ethylhexyl acrylate, in particular n-butyl and 2-ethylhexyl acrylate. These alkly acrylate rubbers may comprise, as commoners, up to 30% by weight of copolymerizable monomers, such as vinyl acetate, (meth)acrylonitrile, styrene, substituted styrene, methyl methacrylate or vinyl ethers.

In one embodiment of the invention the acrylate rubbers further comprise from 0.01 to 20% by weight, preferably from 0.1 to 5% by weight, of polyfunctional monomers with crosslinking action (crosslinking monomers). Examples of these are monomers which contain 2 or more double bonds capable of copolymerization, preferably not conjugated in 1,3 positions.

Examples of suitable crosslinking monomers are ethylene glycol diacrylate or -methacrylate, butanediol diacrylate or -methacrylate, hexanediol diacrylate or -methacrylate, divinylbenzene, diallyl maleate, diallyl fumarate, diallyl phthalate, diethyl phthalate, triallyl cyanurate, triallyl isocyanurate, tricyclodecenyl acrylate, dihydrodicyclopentadienyl acrylate, triallyl phosphate, allyl acrylate and allyl methacrylate, and dicyclopentadienyl acrylate (DCPA) (cf. DE-C 12 60 135).

Examples of suitable silicone rubbers are crosslinked silicone rubbers made from units of the general formulae $R_2SiO$, $RSiO_{3/2}$, $R_3SiO_{1/2}$ and $SiO_{2/4}$, where R is a monovalent radical. The amounts of the individual siloxane units here are judged in such a way that for each 100 units of the formula $R_2SiO$ there are from 0 to 10 molar units of the formula $RSiO_{3/2}$, from 0 to 1.5 molar units of $R_3SiO_{1/2}$ and from 0 to 3 molar units of $SiO_{2/4}$. R here can be either a monovalent saturated hydrocarbon radical having from 1 to 18 carbon atoms, phenyl or alkoxy or a group highly susceptible to free-radical attack, for example vinyl or mercaptopropyl. At least 80% of all of the radicals R are preferably methyl radicals. Combinations of methyl and ethyl or phenyl radicals are particularly preferred.

Preferred silicone rubbers incorporate units of groups susceptible to free-radical attack, in particular vinyl, allyl, halo or mercapto groups, preferably in amounts of from 2 to 10 mol % based on all of the radicals R. They may, for example, be prepared as described in EP-A-0 260 558.

It can be useful in some cases to use an emulsion polymer A made from uncrosslinked polymer. Monomers which can be used to prepare these polymers are all of the abovementioned monomers. Examples of preferred uncrosslinked emulsion polymers A are homo- and copolymers of acrylates, in particular of n-butyl and of ethylhexyl acrylate, and also homo- and copolymers of ethylene, propylene, butylene or isobutylene, and also poly(organosiloxanes). In all cases these may be linear or else branched.

Core-shell Emulsion Polymer A

Emulsion polymer A can also be a polymer built up in more than one stage (have core-shell morphology). For example, an elastomeric core ($T_g<0°$ C.) may have been encapsulated by a hard shell (polymers with $T_g>0°$ C.) or vice versa.

In a particularly preferred embodiment of the invention, component A is a graft copolymer. The graft copolymers A of the molding compositions according to the invention here have a median particle size $d_{50}$ of from 50 to 1000 nm, preferably from 50 to 800 nm.

The graft copolymer A generally has one or more stages, i.e. is a polymer built up from a core and from one or more shells. The polymer is composed of a base (graft: core) A1 and of one or more stages A2 (graft) grafted onto this, known as the graft stages or graft shells.

One or more graft shells may be applied to the rubber particles via simple grafting or multiple stepwise grafting. Each graft shell may have a different formulation. In addition to the grafting monomers and together with these, polyfunctional crosslinking monomers or monomers containing reactive groups may be grafted on (see, for example, EP-A-0 230 282, DE-A-36 01 419 and EP-A-0 269 861).

In a preferred embodiment, component A is composed of a graft copolymer built up in more than one stage, where the grafts have generally been prepared from resin-forming monomers and have a glass transition temperature $T_g$ above 30° C, preferably above 50° C. The function of the outer graft shell is, inter alia, to achieve some degree of compatibility between the rubber particles A and the thermoplastic B.

Graft copolymers A are prepared, for example, by grafting at least one of the monomers A2 listed below onto at least one of the graft bases or graft core materials A1 listed above. Suitable graft bases A1 in the molding compositions according to the invention are any of the polymers which have been described above under the emulsion polymers A.

In one embodiment of the invention the graft base A1 has been formulated from 15 to 99.9% by weight of acrylate rubber, from 0.1 to 5% by weight of crosslinking agent and from 0 to 49.9% by weight of one of the other monomers or rubbers stated.

Suitable monomers for forming the graft A2 may, for example, have been selected from the monomers listed below and mixtures of these:

Vinylaromatic monomers, such as styrene and its substituted derivatives such as α-methylstyrene, p-methylstyrene, 3,4-dimethylstyrene, p-tert-butylstyrene, and p-methyl-α-methylstyrene, and $C_1$–$C_8$-alkyl (meth)acrylates, such as methyl methacrylate, ethyl methacrylate, methyl acrylate, ethyl acrylate, n-butyl acrylate and iso-butyl acrylate. Preference is given to styrene, α-methylstyrene and methyl methacrylate, in particular styrene and/or α-methylstyrene, and ethylenically unsaturated monomers, such as acrylic and methacrylic compounds, for example acrylonitrile, methacrylonitrile, acrylic and methacrylic acid, methyl acrylate, ethyl acrylate, n-propyl and isopropyl acrylate, n-butyl and isobutyl acrylate, tert-butyl acrylate, 2-ethylhexyl acrylate, methyl methacrylate, ethyl methacrylate, n-propyl and isopropyl methacrylate, n-butyl and isobutyl methacrylate, tert-butyl methacrylate, cyclohexyl methacrylate, isobornyl methacrylate, and maleic anhydride and its derivatives, such as maleic esters, maleic diesters and maleimides, e.g. alkyl- and arylmaleimides, for example methyl-, cyclohexyl-and phenylmaleimide. Preference is given to methacrylates, acrylonitrile and methacrylonitrile, in particular acrylonitrile.

Other (co)monomers which may be used are styrene compounds, vinyl compounds, acrylic or methacrylic compounds (e.g. styrene, substituted where appropriate with $C_1$–$C_{12}$-alkyl radicals, with halogen or with halomethylene radicals; vinylnaphthalene, vinylcarbazole; vinyl ethers having $C_1$–$C_{12}$ ether radicals; vinylimidazole, 3-(4-) vinylpyridine, dimethylaminoethyl (meth)acrylate, p-dimethylaminostyrene, acrylonitrile, methacrylonitrile, acrylic acid, methacrylic acid, butyl acrylate, ethylhexyl acrylate and methyl methacrylate, and also fumaric acid, maleic acid or itaconic acid or their anhydrides, amides, nitriles or esters with alcohols containing from 1 to 22 carbon atoms, preferably from 1 to 10 carbon atoms).

In one embodiment of the invention component A encompasses from 30 to 100% by weight, preferably from 50 to: 90% by weight, of the first phase (graft base) A1 described above and from 0 to 50% by weight, preferably from 10 to 50% by weight, of the second phase (graft) A2 described above, based on the total weight of component A. Materials which may be used as the third phase are in particular styrene copolymers.

In one embodiment of the invention crosslinked acrylate polymers with a glass transition temperature below 0° C. are used as graft base A1. The crosslinked acrylate polymers should preferably have a glass transition temperature below −20° C., in particular below −30° C.

In a preferred embodiment the graft A2 is composed of one or more graft shells, the outermost graft shell of these having a glass transition temperature above 30° C., where a polymer formed from the monomers of the graft A2 would have a glass transition temperature above 80° C.

With respect to measurement of the glass transition temperature and the median particle size, and also the values of Q, that which has been said for the emulsion polymers A is applicable to the graft copolymers A.

The graft copolymers A may also be prepared by grafting preformed polymers onto suitable graft homopolymers. Examples of these are the products from reaction of base containing rubbers with copolymers containing maleic anhydride groups or containing acid groups.

Suitable preparation processes for graft copolymers A are emulsion, solution, bulk and suspension polymerization. The graft copolymers A are preferably prepared by free-radical emulsion polymerization, in particular in the presence of latices of component A1 at temperatures of from 20 to 90° C., using water-soluble or oil-soluble initiators, such as peroxodisulfate or benzoyl peroxide, or with the aid of redox initiators. Redox initiators are also suitable for polymerization at below 20° C.

Suitable emulsion polymerization processes are described in DE-A-28 26 925 and 31 49 358 and in DE-C-12 60 135.

The graft shells are preferably built up in an emulsion polymerization process, as described in DE-A-32 27 555, 31

49 357, 31 49 358 and 34 14 118. The specified setting of the particle sizes according to the invention of from 50 to 1000 nm preferably takes place by the processes described in DE-C-12 60 135 and DE-A-28 26 925, and Applied Polymer Science, Vol. 9 (1965), page 2929. The use of polymers with different particle sizes is known, for example, from DE-A-28 26 925 and U.S. Pat. No 5,196,480.

According to the process described in DE-C-12 60 135, the graft base A1 is first prepared by polymerizing the acrylate(s) used in one embodiment of the invention and the polyfunctional monomer which brings about crosslinking, where appropriate together with the other comonomers, in aqueous emulsion in a manner known per se at temperatures of from 20 to 100° C., preferably from 50 to 80° C. The usual emulsifiers may be used, such as alkali metal salts of alkyl- or alkylarylsulfonic acids, alkyl sulfates, fatty alcohol sulfonates, salts of higher fatty acids having from 10 to 30 carbon atoms or resin soaps. Preference is given to the use of the sodium salts of alkylsulfonates or fatty acids having from 10 to 18 carbon atoms. In one embodiment the amounts of the emulsifiers used are from 0.5 to 5% by weight, in particular from 1 to 2% by weight, based on the monomers used in preparing the graft base A1. The weight ratio of water to monomers is generally from 2:1 to 0.7:1. The polymerization initiators used are in particular the common persulfates, such as potassium persulfate. However, redox systems may also be used. The initiators are generally used in amounts of from 0.1 to 1% by weight, based on the monomers used in preparing the graft base A1. Other polymerization auxiliaries which may be used in the polymerization are the usual buffer substances by means of which the pH is set at preferably from 6 to 9, for example sodium bicarbonate and sodium pyrophosphate, and also from 0 to 3% by weight of a molecular weight regulator, such as mercaptans, terpinols or dimeric α-methylstyrene.

In a subsequent step, polymerization of a monomer mixture made from styrene and acrylonitrile in the presence of the resultant latex of the crosslinked acrylate polymer in one embodiment of the invention is carried out to prepare the graft polymer A, where in one embodiment of the invention the weight ratio of styrene to acrylonitrile in the monomer mixture should be in the range from 100:0 to 40:60, and preferably from 65:35 to 85:15. This graft copolymerization of styrene and acrylonitrile onto the crosslinked polyacrylate polymer serving as a graft base is again advantageously carried out in aqueous emulsion under the usual conditions described above. The graft copolymerization may usefully take place in the system used for the emulsion polymerization to prepare the graft base A1, where further emulsifier and initiator may be added if necessary. The mixture of styrene and acrylonitrile monomers which is to be grafted on in one embodiment of the invention may be added to the reaction mixture all at once, in portions in more than one step, or preferably continuously during the course of the polymerization. The graft copolymerization of the mixture of styrene and acrylonitrile in the presence of the crosslinking acrylate polymer is carried out in such a way as to obtain in graft copolymer A a degree of grafting of from 1 to 99% by weight, preferably from 20 to 85% by weight, in particular from 35 to 60% by weight, based on the total weight of component A. Since the grafting yield in the graft copolymerization is not 100% the amount of the mixture of styrene and acrylonitrile monomers which has to be used in the graft copolymerization is somewhat greater than that which corresponds to the desired degree of grafting. Control of the grafting yield in the graft copolymerization, and therefore of the degree of grafting of the finished graft copolymer A, is a topic with which the person skilled in the art is familiar. It may be achieved, for example, via the metering rate of the monomers or via addition of regulator (Chauvel, Daniel, ACS Polymer Preprints 15 (1974), pp. 329 ff.). The emulsion graft copolymerization generally gives a certain percentage by weight, based on the graft copolymer, of free, ungrafted styrene-acrylonitrile copolymer. The proportion of the graft copolymer A in the polymerization product obtained in the graft copolymerization is determined by the method given above.

Preparation of the graft copolymers A by the emulsion process also gives, besides the technical process advantages stated above, the possibility of reproducible changes in particle sizes, for example by agglomerating the particles at least to some extent to give larger particles. This implies that polymers with different particle sizes may also be present in the graft copolymers A.

In one particular embodiment, bimodal particle size distribution for component A has proven particularly advantageous. These can be produced by mixing separately prepared, differently sized particles, which may also differ in their makeup and in their shell structure (core-shell, core-shell-shell, etc.). In an alternative method, a bimodal particle size distribution may be produced by partial agglomeration prior to, during, or after the grafting process.

In particular, component A made from graft base and graft shell(s) can be matched ideally to the respective application, and in particular with respect to particle size.

Graft copolymers A generally comprise from 1 to 99% by weight, preferably from 15 to 80% by weight and particularly preferably from 40 to 65% by weight, of first phase (graft base) A1 and from 1 to 99% by weight, preferably from 20 to 85% by weight, particularly preferably from 35 to 60% by weight, of the second phase (graft) A2, based in each case on the entire graft copolymer.

Component B

Component B is an amorphous or partly crystalline polymer.

Component B is preferably a copolymer made from b1: as component B1, from 40 to 100% by weight, preferably from 60 to 85% by weight, of units of a vinylaromatic monomer, preferably of styrene or of a substituted styrene or of a (meth)acrylate or mixtures of these, in particular of styrene and/or of α-methylstyrene, b2: as component B2, from 0 to 60% by weight, preferably from 15 to 40% by weight, of units of an ethylenically unsaturated monomer, preferably of acrylonitrile or of methacrylonitrile, in particular of acrylonitrile, and b3: from 0 to 60% by weight of another polymerizable ethylenically unsaturated monomer.

In a preferred embodiment of the invention, the viscosity number of component B is from 50 to 120, preferably from 55 to 100.

The amorphous or partly crystalline polymers of component B of the molding composition used according to the invention for producing the moldings of the invention for the garden sector or animal-keeping sector are preferably at least one polymer selected from the class consisting of partly crystalline polyamides, partially aromatic copolyamides, polyolefins, ionomers, polyesters, polyether; ketones, polyoxyalkylenes, polyarylene sulfides and preferably from polymers made from vinylaromatic monomers and/or ethylenically unsaturated monomers. It is also possible to use polymer mixtures.

Other materials suitable as component B of the molding composition used according to the invention for producing the moldings of the invention for the garden sector or animal-keeping sector are semicrystalline, preferably linear, polyamides, such as nylon-6, nylon-6,6, nylon-4,6 and nylon-6,12, and partly crystalline copolyamides based on these components. It is also possible to use partly crystalline polyamides whose acid component is composed partly or entirely of adipic acid and/or terephthalic acid and/or isophthalic acid and/or suberic acid and/or sebacic acid and/or azelaic acid and/or dodecanedicarboxylic acid and/or of a cyclohexanedicarboxylic acid, and whose diamine component is composed in particular partly or entirely of m- and/or p-xylylenediamine and/or hexamethylenediamine and/or 2,2,4- and/or 2,4,4-trimethylhexamethylenediamine and/or isophoronediamine, and whose formulations in principle are known from the prior art (cf. Encyclopedia of Polymers, Vol. 11, pp. 315 ff).

Examples of other polymers suitable as component B of the molding compositions used according to the invention for producing the moldings of the invention for the garden sector or animal-keeping sector are partly crystalline polyolefins, preferably homo- and copolymers of olefins such as ethylene, propylene, 1-butene, 1-pentene, 1-hexene, 1-heptene, 3-methyl-1-butene, 4-methyl-1-butene, 4-methyl-1-pentene and 1-octene. Suitable polyolefins are polyethylene, polypropylene, poly-1-butene and poly-4-methyl-1-pentene. Under polyethylene (PE) a distinction is made in general between high-density PE (HDPE), low-density PE (LDFE) and linear low-density PE (LLDPE).

In another embodiment of the invention ionomers are component B. These are generally polyolefins as described above, in particular polyethylene, which comprise copolymerized monomers with acid groups, e.g. acrylic acid, methacrylic acid and, where appropriate, other copolymerizable monomers. The acid groups are generally converted with the aid of metal ions, such as $Na^+$, $Ca^{2+}$, $Mg^{2+}$ and $Al^{3+}$ into ionic, where appropriate ionically crosslinked, polyolefins which, however, can still be processed thermoplastically (see, for example, U.S. Pat. Nos. 3,264,272; 3,404,134; 3,355,319 and 4,321,337). However, the conversion of the polyolefins containing acid groups by the use of metal ions is not essential. Polyolefins containing free acid groups are also suitable as component B according to the invention. These then generally have rubbery character and to some extent comprise yet other copolymerizable monomers, e.g. (meth)acrylates.

Besides these, polyesters, preferably aromatic/aliphatic polyesters, may also be used as component B. Examples of these are polyalkylene terephthalates, e.g. based on ethylene glycol, 1,3-propanediol, 1,4-butanediol, 1,6-hexanediol and 1,4-bis(hydroxymethyl)cyclohexane, and also polyalkylene naphthalates.

Polyether ketones, for example as described in the publications GB 1 078 234, U.S. Pat. No. 4,010,147, EP-A-0 135 938, EP-A-0 292 211, EP-A-0 275 035, EF-A-0 270 998 and EP-A-0 165 406, and in the publication by C. K. Sham et al., Polymer 29/6, (1988), 1016–1020, may also be used as component B.

Polyoxyalkylenes, e.g. polyoxvmethylene, and oxymethylene polymers may also be used as component B of the molding compositions used according to the invention for producing the moldings of the invention for the garden sector or animal-keeping sector.

Other polymers suitable as component B are polyarylene sulfides, in particular polyphenylene sulfide.

The component B used is preferably an amorphous copolymer of styrene and/or α-methylstyrene with acrylonitrile. The acrylonitrile content in these copolymers of component B is from 0 to 60by weight, preferably from 15 to 40% by weight, based on the total weight of component B. The free, ungrafted styrene-acrylonitrile copolymers produced during the graft copolymerization to prepare component A also count as part of component B. Depending on the conditions selected for the graft copolymerization to prepare the graft copolymer A, a sufficient proportion of component B may already have been formed during the graft copolymerization. However, it will generally be necessary for the products obtained in the graft copolymerization to be blended with additional component B prepared separately.

This additional, separately prepared component B may preferably be a styrene-acrylonitrile copolymer, an α-methylstyrene-acrylonitrile copolymer or an α-methylstyrene-styrene-acrylonitrile terpolymer. These copolymers may be used for component B either as individual polymers or else as a mixture, and therefore the additional, separately prepared component B of the molding compositions used according to the invention may be, for example, a mixture of a styrene-acrylonitrile copolymer with an α-methylstyrene-acrylonitrile copolymer. In the event that component B of the molding compositions used according to the invention is composed of a mixture of a styrene-acrylonitrile copolymer with an α-methylstyrene-acrylonitrile copolymer, the acrylonitrile contents of the two copolymers should preferably differ from one another by not more than 10% by weight, preferably not more than 5% by weight, based on the total weight of the copolymer. Component B of the molding compositions used according to the invention may, however, also be composed solely of a single styrene-acrylonitrile copolymer if the starting materials for the graft copolymerizations to prepare component A and for the preparation of the additional, separately prepared component B are the same monomer mixture of styrene and acrylonitrile.

The additional, separately prepared component B may be obtained by the conventional processes. In one embodiment of the invention, therefore, the copolymerization of the styrene and/or α-methylstyrene with the acrylonitrile may be carried out in bulk, solution, suspension or aqueous emulsion. Component B preferably has a viscosity number of from 40 to 120, preferably from 50 to 120, in particular from 55 to 100. The viscosity number is determined here in accordance with DIN 53 726, by dissolving 0.5 g of material in 100 ml of dimethylformamide.

Components A and B may be mixed in any desired manner using any of the known methods. If, for example, components A and B have been prepared by emulsion polymerization, the polymer dispersions obtained may be mixed with one another, the polymers then precipitated together and the polymer mixture worked up. However, the blending of components A and B preferably takes place by extruding, kneading or rolling the components together. If required, the components have previously been isolated from the aqueous dispersion or solution obtained in the polymerization. The products of the graft copolymerization (component A) which have been obtained in aqueous dispersion may also be only partly dewatered and mixed in the form of moist crumbs with component B. In this case the complete drying of the graft copolymers takes place during the mixing.

Component C

Suitable polycarbonates C are known per se. They preferably have a molar mass (weight average M, determined using gel permeation chromatography in tetrahydrofuran against polystyrene standards) in the range from 10,000 to 60,000 g/mol. They are obtainable, for example, by the processes of DE-B-1 300 266 by interfacial polycondensation or by the process of DE-A-1 495 730 by reacting diphenyl carbonate with bisphenols. A preferred bisphenol is 2,2-di(4-hydroxyphenyl)propane, referred to generally, and also below, as bisphenol A.

Instead of bisphenol A use may also be made of other aromatic dihydroxy compounds, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane, 4,4-dihydroxydiphenyl or dihydroxydiphenylcycloalkanes, preferably dihydroxydiphenylcyclohexanes or dihydroxycyclopentanes, in particular 1,1-bis(4-hydroxyphenyl)-3,3,5-trirmethylcyclo-hexane, or also mixtures of the abovementioned dihydroxy compounds.

Particularly preferred polycarbonates are those based on bisphenol A or bisphenol A together with up to 80 mol % of the abovementioned aromatic dihydroxy compounds.

It is also possible to use copolycarbonates according to U.S. Pat. No. 3,737,409. Copolycarbonates based on bisphenol A and di(3,5-dimethyldihydroxyphenyl) sulfone are of particular interest here and have high heat resistance. It is also possible to use mixtures of different polycarbonates.

According to the invention, the average molar masses (weight average M, determined with the aid of gel permeation chromatography in tetrahydrofuran against polystyrene standards) of the polycarbonates C are in the range from 10,000 to 64,000 g/mol. They are preferably in the range from 15,000 to 63,000 g/mol, in particular from 15,000 to 60,000 g/mol. This implies that the polycarbcnates C have relative solution viscosities, measured in 0.5% strength by weight solution in dichloromethane at 25° C., in the range from 1.1 to 1.3, preferably from 1.15 to 1.33. The relative solution viscosities of the polycarbonates used preferably do not differ by more than 0.05, in particular by not more than 0.04.

The polycarbonates C may be used either as ground material or as pellets. They are present as component C in amounts of from 51 to 98% by weight, preferably from 55 to 90% by weight, in particular from 60 to 85% by weight, based in each case on the entire molding composition.

In one embodiment of the invention, the addition of polycarbonates leads, inter alia, to higher thermal stability and improved cracking resistance of the molding compositions used according to the invention for producing the moldings of the invention for the garden sector or animal-keeping sector.

Component D

The preferred thermoplastic molding compositions used according to the invention for producing the moldings of the invention for the garden sector or animal-keeping sector comprise, as component D, from 0 to 50% by weight, preferably from 0 to 37% by weight, in particular from 0 to 30% by weight, of fibrous or particulate fillers or of other additives or of mixtures of these, based in each case on the entire molding composition. These are preferably commercially available products.

Reinforcing agents, such as carbon fibers and glass fibers, are usually used in amounts of from 5 to 509 by weight, based on the entire molding composition.

The glass fibers used may be made from E, A or C glass and have preferably been provided with a size and with a coupling agent. Their diameter is generally from 6 to 20 $\mu$m. Use may be made either of continuous fibers (rovings) or of conventional chopped glass fibers (staple).

It is also possible to use fillers or reinforcing substances such as glass beads, mineral fibers, whiskers, alumina fibers, mica, powdered quartz and wollastonite.

In addition, metal flakes (e.g. aluminum flakes from Transmet Corp.), metal powders, metal fibers, metal-coated fillers, e.g. nickel-coated glass fibers, and also other additives which screen electromagnetic waves, may be admixed with the molding compositions used according to the invention for producing the moldings of the invention. Aluminum flakes (K 102 from Transmet) are particularly suitable for EMI (electromagnetic interference) purposes. The compositions may also be mixed with additional carbon fibers, carbon black, in particular conductivity black, or nickel-coated carbon fibers.

The molding compositions used according to the invention for producing the moldings of the invention for the garden sector or animal-keeping sector may also comprise other additives D typical of and commonly used for polycarbonates, for SAN polymers or for graft copolymers or for mixtures of these. Examples of additives of this type are: dyes, pigments, colorants, antistats, antioxidants, stabilizers for improving thermal stability, for increasing photostability and for raising hydrolysis resistance and chemicals resistance, buffer substances, flame retardants, drop inhibitors, transesterification inhibitors, agents to counteract thermal decomposition, and in particular the lubricants and waxes which are useful for producing moldings. These other additives may be metered in at any stage of the production process, but preferably at an early juncture in order to make early use of the stabilizing effects (or other specific effects) of the additive. Heat stabilizers or oxidation inhibitors are usually metal halides (chlorides, bromides or iodides) derived from metals of Group I of the Periodic Table of the Elements (for example Li, Na, K or Cu).

Other suitable stabilizers are the usual hindered phenols, or else vitamin E and/or compounds of similar structure, HALS stabilizers (hindered amine light stabilizers), benzophenones, resorcinols, salicylates, benzotriazoles and other compounds are also suitable (for example Irganox®, Tinuvin®, such as Tinuvin® 770 (HALS absorber, bis(2,2, 6,6-tetramethyl-4-piperidyl) sebacate) or Tinuvin®P (UV absorber (2H-benzotriazol-2-yl)-4-methylphenol), Topanol®). These are usually used in amounts of up to 2% by weight (based on the entire mixture).

Suitable lubricants and mold-release agents are stearic acids, stearyl alcohol, stearates and/or higher fatty acids in general, derivatives of these and corresponding fatty acid mixtures having from 12 to 30 carbon atoms. The amounts of these additions are in the range from 0.05 to 1% by weight.

Other possible additives are silicone oils, oligomeric isobutylene or similar substances, usually in amounts of from 0.05 to 5% by weight. It is also possible to use pigments, dyes and color brighteners, such as ultramarine blue, phthalocyanines, titanium dioxide, cadmium sulfides and derivatives of perylenetetracarboxylic acid.

Use may also be made of commercially available halogen-free or halogen-containing flame retardants, in the usual amounts, such as up to 20% by weight. Examples of halogen free flame retardants are described in EP-A-0 149 813. Reference may also be made to DE-A-34 36 815 and particular preference is given here to poly (tetrabromobisphenol A glycidyl ether) with a molecular weight of 40,000.

Processing aids and stabilizers, such as UV stabilizers, lubricants and antistats, are usually used in amounts of from 0.01 to 5% by weight, based on the entire molding composition.

The thermoplastic molding compositions used according to the invention for producing the moldings of the invention for the garden sector or animal-keeping sector may be prepared by processes known per se, by mixing the components. It can be advantageous to premix individual components. It is also possible to mix the components in solution and to remove the solvents.

Suitable organic solvents are, for example, chlorobenzene, mixtures of chlorobenzene and methylene chloride or mixtures of chlorobenzene or of aromatic hydrocarbons, e.g. toluene.

The removal of solvent from the solvent mixtures may take place, for example, in vented extruders.

The mixing of the, for example, dry components may take place by any of the known methods. However, the mixing is preferably carried out by extruding, kneading or rolling the components, preferably at temperatures of from 180 to 400° C. If necessary, the components may previously have been isolated from the solution obtained during the polymerization, or from the aqueous dispersion.

The components here may be metered in either together or separately/in succession.

In one embodiment of the invention, he moldings of the invention for the garden sector or animal-keeping sector may be produced by the known thermoplastic processing methods from the thermoplastic molding compositions used according to the invention. In particular, they may be produced by thermoforming, extrusion, injection molding, calendering, blow molding, compression molding, sintering or, pressure sintering, preferably by injection molding. Specifically, use is made of calendering and thermoforming processes for producing and, respectively, using intermediate products in the form of sheets or films.

The moldings for the garden sector or animal-keeping sector may be garden buildings, garden equipment, garden furniture or garden accessories. Examples of garden buildings are summerhouses, garden sheds, carports, greenhouses, trellis components, and pergolas. Examples of garden equipment or housings for the same are lawnmowers, rapid composters, shredders, rainwater-collection systems, and weather stations. Examples of garden accessories are garden lamps, candelabras, lighting systems, party lights, decorative components, grilles, flower boxes and plant containers, hose carts, irrigation systems, and also garden figures, such as garden gnomes, and nest boxes, etc. Examples of garden furniture are benches, tables, chairs, loungers, parasols, etc. Examples of moldings from the animal-keeping sector are stock fences, such as those for paddocks, cages for small animals, containers for transporting small animals, play equipment for small animals, such as scratchers for cats, hen houses, rabbit hutches, and other constructions suitable for animal-keeping.

A common factor in all of the abovementioned application sectors is that there is exposure to weathering, i.e. rain, cold, heat, insolation, etc. They are free-standing, i.e. they have a certain degree of intrinsic stability and stiffness.

The invention also relates to semifinished products made from the molding compositions and to sheets, profiles, films, etc. destined for the production of the moldings for the garden sector or the animal-keeping sector.

To improve stiffness and thermal insulation, it, is also possible to foam-fill hollow profiles suitable for garden buildings, for example, using suitable foam systems (such as PU), by introducing a foaming system into the cavity of the profile, either before profile extrusion is complete or subsequently, and foaming the system there. Profile/sheet systems of this type are suitable for the abovementioned summerhouses, fencing, carports, trellis components, and garden furniture, for example. It is also possible, for example, to seal the free surfaces formed on profiles of this type by using mineral glass, acrylic sheeting, PC sheeting or other partially or fully transparent materials. The molding compositions of the invention may also be used for cages for transporting or keeping small animals, since the compositions are stiff, scratch-resistant, weathering-resistant, and resistant to mold and bacterial infestation and to biting. They are easy to clean, since there is a low level of adhesion to animal excrement, and cleaning compositions do not generally lead to corrosion.

Due to their high thermal stability and dimensional stability, the molding compositions of the invention may also be used for parts of solar installations, for example in the photovoltaic sector or the water-heating sector.

The moldings of the invention for the garden sector or animal-keeping sector or the associated housings are also resistant to yellowing, and highly stable. They have a balanced ratio of toughness and flexural strength.

Due to the high content of polycarbonates in the molding compositions, the moldings for the garden sector or animal-keeping sector are very heat-resistant and can resist heat over prolonged periods. Addition of the polycarbonate as component C here gives an additional improvement in the heat resistance and impact strength of the moldings for the garden sector or animal-keeping sector. These moldings for the garden sector or animal-keeping sector also have good dimensional stability, and excellent resistance to heat-aging, and high yellowing resistance when exposed to heat and the action of UV radiation.

The moldings for the garden sector or animal-keeping sector have excellent surface quality, obtained even without additional surface treatment. By appropriately modifying the rubber morphology, the appearance of the finished surfaces of the housings and protective coverings for filters, pumps, or motors can be modified, for example in order to achieve glossy or matt surface effects. The moldings for the garden sector or animal-keeping sector show very little graying or yellowing when exposed to the action of weathering and UV radiation, and their surface properties are therefore retained. Other advantageous properties of the moldings for the garden sector or animal-keeping sector are their high weathering resistance, good heat resistance, high yellowing resistance under UV radiation and exposure to heat, good stress cracking resistance, in particular when exposed to the action of chemicals, and good anti-electrostatic performance. They also have high color fastness, in part associated, for example, with their excellent resistance to yellowing and embrittlement. The moldings of the invention for the garden sector or animal-keeping sector made from the thermoplastic molding compositions used according to the invention show no significant loss of toughness or impact strength either at low temperatures or after prolonged exposure to the action of heat, and these properties are also retained under exposure to UV rays. Tensile strength is also retained. In addition, the inventive molding compositions and, respectively, moldings for the garden sector or animal-keeping sector made from the same have high resistance to damage by scratching, high resistance to swelling, and also low permeability to fluids and gases, and also have good flame retardancy.

According to the present invention, it is possible to reuse already used thermoplastic molding compositions for producing the moldings of the invention for the garden sector or animal-keeping sector. The high colorfastness, weathering resistance and aging resistance of the molding compositions used according to the invention gives them very good suitability for recycling. The proportion of recycled molding composition here can be high. For example, use of 30% by weight of previously used molding composition, admixed in ground form with the molding compositions used according to the invention, did not significantly change the relevant material properties, such as flowability, Vicat softening point and impact strength, of the molding compositions and of the moldings of the invention produced therefrom for the garden sector or animal-keeping sector. Similar results were achieved in studies of weathering resistance. The impact strength was also constant over a long period when reused thermoplastic molding compositions were used, see Lindenschmidt, Ruppmich, Hoven-Nievelstein, International Body Engineering Conference, Sep. 21 to 23, 1993, Detroit, Mich., USA, Interior and Exterior Systems, pages 61–64. Resistance to yellowing was also retained.

The invention is described in more detail using the examples below.

EXAMPLES

Example 1

Preparation of Fine-particle Graft Copolymer (A)

(a1) 16 parts of butyl acrylate and 0.4 part of tricyclodecenyl acrylate were heated to 60° C. with stirring in 150 parts of water with addition of 1 part of the sodium salt of a $C_{12}$–$C_{18}$ paraffin sulfonic acid, 0.3 part of potassium persulfate, 0.3 part of sodium hydrogencarbonate and 0.15 part of sodium pyrophosphate. 10 minutes after the polymerization reaction had begun, a mixture of 82 parts of butyl acrylate and 1.6 parts of tricyclodecenyl acrylate was added within a period of 3 hours. After monomer addition had ended, the reaction was allowed to continue for a further hour. The resultant latex of the crosslinked butyl acrylate polymer had a solids content of 40% by weight. The median particle size (ponderal median) was determined as 76 nm. The particle size distribution was narrow (quotient Q=0.29).

(a2) 150 parts of the polybutyl acrylate latex obtained in (a1) were mixed with 40 parts of a mixture of styrene and acrylonitrile (weight ratio 75:25) and 60 parts of water, and heated at 65° C. for 4 hours with stirring after adding a further 0.03 part of potassium persulfate and 0.05 part of lauroyl peroxide. After the graft copolymerization had ended, the polymerization product was precipitated from the dispersion at 95° C. using calcium chloride solution, washed with water and dried in a stream of warm air. The degree of grafting of the graft copolymer was 35%.

Example 2

Preparation of Coarse-particle Graft Copolymer (A)

(a1) 50 parts of water and 0.1 part of potassium persulfate were added to 2.5 parts of the latex prepared in step (a1) in Example 1. A mixture of 49 parts of butyl acrylate and 1 part of tricyclodecenyl acrylate and, secondly, a solution of 0.5 part of the sodium salt of a $C_{12}$–$C_{18}$ paraffinsulfonic acid in 25 parts of water were run in at 60° C. over the course of 3 hours. After the feed had ended, polymerization was continued for 2 hours. The resultant latex of the crosslinked butyl acrylate polymer had a solids content of 40%. The median particle size (ponderal median of the latex) was determined as 268 nm. The particle size distribution was narrow (Q=0.1)

(a2) 150 parts of this latex were mixed with 40 parts of a mixture of styrene and acrylonitrile (ratio 75:25) and with 110 parts of water, and heated at 65° C. for 4 hours with stirring after addition of a further 0.03 part of potassium persulfate and 0.05 part of lauroyl peroxide. The polymerization product obtained in the graft copolymerization was then precipitated from the dispersion at 95° C. using a calcium chloride solution, separated off, washed with water and dried in a stream of warm air. The degree of grafting of the graft copolymer was determined as 27%.

Example 3

Preparation of Coarse-particle Graft Copolymer (A)

(a1) 16 parts of butyl acrylate and 0.4 part of tricyclodecenyl acrylate were added to 150 parts of water and 0.5 part of the sodium, salt of a $C_{12}$–$C_{18}$ paraffinsulfonic acid, 0.3 part of potassium persulfate, 0.3 part of sodium hydrogencarbonate and part of sodium pyrophosphate, and the mixture was heated to 60° C. with stirring. 10 minutes after the polymerization reaction had begun, a mixture of 82 parts of butyl acrylate and 1.6 parts of tricyclodecenyl acrylate was added within a period of 3 hours. After the monomer addition had ended, the reaction was allowed to continue for a further hour. The resultant latex of the crosslinked butylacrylate polymer had a solids content of 40% by weight. The median particle size (ponderal median) was determined as 216 nm. The particle size distribution was narrow (Q=0.29).

(a2) 150 parts of the polybutyl acrylate latex obtained in (a1) were mixed with 20 parts of styrene and 60 parts of water and heated at 65° C. for 3 hours with stirring after addition of a further 0.03 part of potassium persulfate and 0.05 part of lauroyl peroxide. After the first step of the graft copolymerization had ended the graft copolymer had a degree of grafting of 17%. This graft copolymer dispersion, without further additives, was polymerized with 20 parts of a mixture of styrene and acrylonitrile (ratio 75:25) for a further 3 hours. After the graft copolymerization had ended, the product was precipitated from the dispersion using calcium chloride solution at 95° C., washed with water and dried in a stream of warm air. The degree of grafting of the graft copolymer was 35% and the median particle size of the latex particles was determined as 238 nm.

Example 4

Preparation of Coarse-particle Graft Copolymer (A)

(a1) 50 parts of water and 0.1 part of potassium persulfate were added to 2.5 parts of the latex prepared in Example 3 (component A). A mixture of 49 parts of butyl acrylate and 1 part of tricyclodecenyl acrylate and, secondly, a solution of 0.5 part of the sodium salt of a $C_{12}$–$C_{18}$ paraffinsulfonic acid in 25 parts of water were run in at 60° C. over the course of 3 hours. After the feed had ended, polymerization was continued for 2 hours. The resultant latex of the crosslinked butyl acrylate polymer had a solids content of 40%. The median particle size (ponderal median) of the latex was determined as 410 nm. The particle size distribution was narrow (Q=0.1)

(a2) 150 parts of the polybutyl acrylate latex obtained in (a1) were mixed with 20 parts of styrene and 60 parts of water and heated at 65° C. for 3 hours with stirring after addition of a further 0.03 part of potassium persulfate and 0.05 part of lauroyl peroxide. The dispersion obtained in this graft copolymerization was then polymerized with 20 parts of a mixture of styrene and acrylonitrile in a ratio of 75:25 for a further 4 hours. The reaction product was then precipitated from the dispersion using a calcium chloride solution at 95° C., separated off, washed with water and dried in a stream of warm air. The degree of grafting of the graft copolymer was determined as 35% and the median particle size of the latex particles was 490 nm.

Example 5

Preparation of Coarse-particle Graft Copolymer (A)

(a1) 98 parts of butyl acrylate and 2 parts of tricyclodecenyl acrylate were polymerized at 65° C. for 3 hours with stirring in 154 parts of water with addition of 2 parts of sodium dioctyl sulfosuccinate (70% strength) as emulsifier and 0.5 part of potassium persulfate. This gave an approximately 40% strength dispersion. The median particle size of the latex was about 100 nm.

2.5 parts of this latex were mixed with 400 parts of water and 0.5 part of potassium persulfate, and a mixture of 49 parts of butyl acrylate, 1 part of tricyclodecenyl acrylate and 0.38 part of the emulsifier was added at 65° C. within a period of 1 hour. During the course of a further hour a mixture of 49 parts of butyl acrylate, 1 part of tricyclodecenyl acrylate and 0.76 part of emulsifier was added. After addition of 1 part of potassium persulfate in 40 parts of water, a mixture of 196 parts of butyl acrylate, 4 parts of tricyclodecenyl acrylate and 1.52 parts of the emulsifier was finally added dropwise within a period of 2 hours. The polymerization of the polymer mixture was then continued for a further 2 hours at 65° C. This gave an approximately 40% strength dispersion with a median particle diameter of about 500 nm.

If, instead of 300 parts of monomers, only 100 parts were added, the latex obtained then had a median particle diameter of about 300 nm.

(a2) 465 parts of styrene and 200 parts of acrylonitrile were polymerized at 60° C., with stirring, in the presence of 2500 parts of the polymer latex of (a1) with the median particle size of, respectively, 0.1, 0.3 and 0.5 μm, 2 parts of potassium sulfate, 1.33 parts of lauroyl peroxide and 1005 parts of water. This gave a 40% strength dispersion from which the solid product was precipitated by addition of a 0.5% strength solution of calcium chloride, washed with water and dried.

Example 6

Preparation of Copolymer (B)

A monomer mixture of styrene and acrylonitrile was polymerized under conventional conditions in solution. The resultant styrene-acrylonitrile copolymer had an acrylonitrile content of 35% by weight, based on the copolymer, and a viscosity number of 80 ml/g.

Example 7

Preparation of Copolymer (B)

A monomer mixture of styrene and acrylonitrile was polymerized under conventional conditions in solution. The resultant styrene-acrylonitrile copolymer had an acrylonitrile content of 18% by weight, based on the copolymer, and a viscosity number of 70 ml/g.

Example 8

Preparation of Copolymer (B)

A monomer mixture of styrene and acrylonitrile was polymerized under conventional conditions in solution. The resultant styrene-acrylonitrile copolymer had an acrylonitrile content of 27% by weight, based on the copolymer, and a viscosity number of 80 ml/g.

Comparative Example 1

ABS Polymer

The comparative polymer used was a polybutadiene rubber which had been grafted with a styrene-acrylonitrile copolymer as component (A), in a styrene-acrylonitrile copolymer matrix as component (B). The content of graft rubber was 30% by weight, based on the total weight of the finished polymer.

Example 9

Component C

The component C used was a conventional polycarbonate (PC) which had a viscosity number of 61.5 ml/g, determined in methylene chloride as solvent. The amounts shown in Table 1 below of the appropriate polymers (A), (B) and (C) and, respectively, of the comparative compositions, were mixed in a screw extruder at from 250 to 280° C. The resultant molding compositions were used to produce moldings.

The table below gives the makeups of the molding compositions:

TABLE I

| Molding composition | Component from example | Proportion % by weight |
|---|---|---|
| I | A:1 | 5 |
|  | A:2 | 5 |
|  | B:6 | 30 |
|  | C:9 | 60 |
| II | A:1 | 5 |
|  | A:2 | 5 |
|  | B:6 | 20 |
|  | C:9 | 70 |
| III | A:1 | 11 |
|  | A:2 | 8 |
|  | B:6 | 26 |
|  | C:9 | 55 |
| Comp. I | ABS: Comp. 1 | 40 |
|  | C:9 | 60 |
| Comp. II | A:1 | 10 |
|  | A:2 | 10 |
|  | B:6 | 45 |
|  | C:9 | 35 |
| Comp. III | A:1 | 5 |
|  | A:2 | 5 |
|  | B:6 | 45 |
|  | C:9 | 45 |
| Comp. IV | ABS: Comp. 1 | 100 |
| Comp. V | A:1 | 30 |
|  | B:6 | 70 |
| Comp. VI | A:1 | 25 |
|  | A:2 | 5 |
|  | B:6 | 70 |
| Comp. VII | A:1 | 14 |
|  | A:2 | 10 |
|  | B:6 | 31 |
|  | C:9 | 45 |

Results of Tests a: Scratch Resistance

Scratch resistance is determined using a CSEM automatic scratch tester, model AMI (manufacturer: Centre Suisse d'Electronique et de Microtechnique S.A.). The, scratch tester has a diamond tip with 120° tip angle and 0.2 mm radius. This diamond tip is used to introduce scratches 5 mm in length into injection moldings made from the material to be tested. Unless otherwise stated, the force with which the diamond is applied is 2.6 N. After a waiting time of one hour, the resultant scratches are scanned transversely and their height/depth profile plotted. This enables the scratch depth to be read off.

b: Stress Cracking Resistance

Stress cracking resistance is determined by the bent strip method to ISO 4599. The test specimens used here are injection-molded. Their dimensions are 60×15×2 mm. Unless otherwise stated, the bending radius used for the specimens was 50 mm. For the test, the specimens were clamped into a template, bent and wetted over a period of 24 h with the test medium. The impact energy at fracture is then determined using a pendulum. The test medium used in b1 was isopropanol. In b2 a conventional household cleaner (Ajax Ultra Classic® from Colgate Palmolive Deutschland, a surfactant household cleaner) was used.

c: Swelling

To measure swelling, injection-molded dumbbell specimens (tensile specimens to ISO 3167 of thickness 4 mm) are stored for 96 h in the test medium. Their surfaces are then dried and the change in weight determined, and also, where appropriate, the change in tensile modulus of elasticity (determined to ISO 527) in comparison to the initial value. In Table II, column c1 shows the change in weight in methanol, c2 in premium-grade gasoline and c3 the change in tensile modulus of elasticity in premium-grade gasoline.

d: Permeability

To test permeability, films are pressed from the material to be tested (thickness from about 120 to 250 $\mu$m), and their permeability to the gases and, respectively, liquids given is determined at 23° C. The values here are given in (cm$^3$ 100 $\mu$m)/(m$^2$ d bar) for gases and, respectively, in (g 100 $\mu$m)/(m$^2$ d) for water (Table III).

Molding compositions which can be used with advantage should fulfill the following conditions: scratch depth less than 6 $\mu$m, change in impact energy compared with initial value below 10%, swelling in methanol below 1% and, respectively, swelling and change of modulus of elasticity below 6% in premium-grade gasoline.

The results are given in Tables II and III below.

TABLE II

| Molding composition | a (in $\mu$m) | b1 (in %) | b2 (in %) | c1 (in %) | c2 (in %) | c3 (in %) |
|---|---|---|---|---|---|---|
| I | 3.6 | −8 | — | 0.8 | — | — |
| II | 3.0 | — | −8 | — | 0.4 | −4 |
| III | 5.9 | −6 | — | 0.96 | 5.1 | — |
| Comp. I | 6.0 | −55 | −34 | — | — | — |
| Comp. II | 6.2 | −68 | −86 | — | 0.6 | −10 |
| Comp. III | 5.8 | −35 | −55 | 2 | 0.5 | −8 |
| Comp. IV | 7.4 | −45 | −20 | 6 | 9 | −28 |
| Comp. V | 7.2 | −10 | — | 7 | — | — |
| Comp. VI | 6.9 | — | −10 | — | 4 | −26 |
| Comp. VII | 8.1 | −6 | −42 | 1.2 | 10.2 | — |

TABLE III

| Molding composition | Nitrogen | Oxygen | Water |
|---|---|---|---|
| I | 220 | 870 | 24 |
| Comp. V | 350 | 1200 | 45 |

In addition, the swelling of molding composition III and comparative molding composition VII was studied for different exposure times. The results are given in Table IV below:

TABLE IV

Swelling (weight change) in ethanol and premium-grade gasoline

| Molding composition: | 1 day | 2 days | 3 days | 4 days |
|---|---|---|---|---|
| Methanol: | | | | |
| Comp. VII | 0.66% | 0.90% | 1.10% | 1.20% |
| III | 0.50% | 0.71% | 0.83% | 0.96% |
| Premium-grade gasoline: | | | | |
| Comp. VII | 4.70% | 6.80% | 8.40% | 10.20% |
| III | 2.30% | 3.50% | 4.10% | 5.10% |

For molding compositions I, II and comparative composition III, fogging performance was also studied to VW-PV 3015, Method B (100° C., 16 h). Little fogging was observed for molding composition I, hardly any fogging for molding composition II, but noticeable fogging for comparative molding composition III.

The maximum use temperature was determined as 110° C. for molding composition I and 115° C. for molding composition II.

The molding compositions with a proportion of more than 50% by weight of polycarbonate had an excellent combination of properties. This advantageous property profile makes them particularly suitable for use in moldings for the garden sector or animal-keeping sector.

We claim:

1. A molding for the garden sector or animal-keeping sector or an associated housing made from a thermoplastic molding composition which is not ABS and which consists of, based on the total of the amounts of components A, B, C, and, where appropriate, D, this total being 100% by weight,
   a: as component A, from 1 to 48% by weight of at least one particulate emulsion polymer which has multiple phases and has a glass transition temperature below 0° C. in at least one phase, and has a median particle size from 50 to 1000 nm, made from
      a1: from 1 to 99% by weight of a particulate first phase A1 with a glass transition temperature below 0° C., made from the monomers
         a11: as component A11, 80 to 99.9% by weight of an $C_{1-8}$ alkyl ester of acrylic acid,
         a12: as component A12, 0.01 to 20% by weight of a polyfunctional crosslinking monomer,
      a2: from 1 to 99% by weight of a second phase A2 made from the following monomers, based on A2,
         a21: as component A21, from 40 to 100% by weight of units of a vinylaromatic monomer, and
         a22: as component A22, from 0 to 60% by weight of units of an ethylenically unsaturated monomer, and
      a3: as component A3, from 0 to 50% by weight of a third phase with a glass transition temperature above 0° C., where the total amount of components A1, A2, and A3 is 100% by weight, b: as component B, from 1 to 48% by weight of at least one amorphous or semicrystalline polymer made from 40–100% by weight of styrene and/or α-methylstyrene and 0–60% by weight of acrylonitrile, c: as component C, from 51 to 98% by weight of polycarbonates, and d: as component D, from 0 to 47% by weight of conventional additives and/or fibrous or particulate fillers, or a mixture of these.

2. A mold as claimed in claim 1, wherein, based on the total weight of component A, the particle size distribution of component A is bimodal, from 1 to 99% by weight having a median particle size of from 50 to 200 nm, and from 1 to 99% by weight having a median particle size of from 200 to 1000 nm.

3. A mold as claimed in claim 1, wherein the moldings for the garden sector are garden buildings, garden equipment, garden fittings, garden furniture, or garden accessories.

4. A mold as claimed in claim 1, wherein the moldings for the animal-keeping sector stock fences, cages for small animals or transport containers for small animals.

* * * * *

UNITED STATES PATENT AND TRADEMARK OFFICE
CERTIFICATE OF CORRECTION

PATENT NO.   : 6,566,436 B1
DATED        : May 20, 2003
INVENTOR(S)  : Norbert Guentherberg et al.

It is certified that error appears in the above-identified patent and that said Letters Patent is hereby corrected as shown below:

Column 22,
Line 10, "sector stock" should be -- sector are stock --.

Signed and Sealed this

Ninth Day of September, 2003

JAMES E. ROGAN
*Director of the United States Patent and Trademark Office*